United States Patent
Galpin et al.

(10) Patent No.: US 11,991,389 B2
(45) Date of Patent: May 21, 2024

(54) METHOD AND APPARATUS FOR VIDEO ENCODING AND DECODING WITH OPTICAL FLOW BASED ON BOUNDARY SMOOTHED MOTION COMPENSATION

(71) Applicant: InterDigital Madison Patent Holdings, SAS, Paris (FR)

(72) Inventors: Franck Galpin, Thorigne-Fouillard (FR); Antoine Robert, Mézières sur Couesnon (FR); Fabrice Leleannec, Betton (FR)

(73) Assignee: InterDigital Madison Holdings, SAS, Paris (FR)

( * ) Notice: Subject to any disclaimer, the term of this patent is extended or adjusted under 35 U.S.C. 154(b) by 186 days.

(21) Appl. No.: 17/603,644

(22) PCT Filed: Apr. 14, 2020

(86) PCT No.: PCT/US2020/028074
§ 371 (c)(1),
(2) Date: Oct. 14, 2021

(87) PCT Pub. No.: WO2020/214564
PCT Pub. Date: Oct. 22, 2020

(65) Prior Publication Data
US 2022/0201328 A1    Jun. 23, 2022

(30) Foreign Application Priority Data
Apr. 18, 2019 (EP) ..................................... 19305508

(51) Int. Cl.
*H04N 19/583* (2014.01)
*H04N 19/105* (2014.01)
(Continued)

(52) U.S. Cl.
CPC ......... *H04N 19/583* (2014.11); *H04N 19/105* (2014.11); *H04N 19/137* (2014.11);
(Continued)

(58) Field of Classification Search
None
See application file for complete search history.

(56) References Cited

U.S. PATENT DOCUMENTS

2018/0262773 A1*  9/2018  Chuang ................ H04N 19/107

FOREIGN PATENT DOCUMENTS

WO    WO 2018171796 A1    9/2018

OTHER PUBLICATIONS

Anonymous, "Reference software for ITU-T H.265 High Efficiency Video Coding", Telecommunication Standardization Sector of ITU, Series H: Audiovisual and Multimedia Systems, Infrastructure of audiovisual services—Coding of moving video, Recommendation H.265.2, Oct. 2014, 12 pages.
(Continued)

*Primary Examiner* — Xiaolan Xu
(74) *Attorney, Agent, or Firm* — Smadar Gefen

(57) ABSTRACT

Different implementations are described, particularly implementations for video encoding and decoding are presented. According to an implementation, in a method for encoding or decoding a part of an image, an inter-prediction refinement of the image block using optical flow based on boundary smoothed motion compensation is performed. The inter-prediction refinement of the image block further comprises obtaining a motion information for the block, a motion information for the top neighboring block, a motion information for the left neighboring block; and applying an optical flow based on a weighted sum of the obtained motion information to refine the prediction for the block. Advantageously, the refined inter-prediction is applied on boundary
(Continued)

sub-blocks of the causal border of the image block or on any sub-block of the image block at a sub-block level if the image block has sub-block motion field.

22 Claims, 12 Drawing Sheets

(51) Int. Cl.
　　　*H04N 19/137*　　(2014.01)
　　　*H04N 19/159*　　(2014.01)
　　　*H04N 19/167*　　(2014.01)
　　　*H04N 19/176*　　(2014.01)
　　　*H04N 19/182*　　(2014.01)
　　　*H04N 19/55*　　(2014.01)
　　　*H04N 19/70*　　(2014.01)

(52) U.S. Cl.
　　　CPC ......... *H04N 19/159* (2014.11); *H04N 19/167* (2014.11); *H04N 19/176* (2014.11); *H04N 19/182* (2014.11); *H04N 19/55* (2014.11); *H04N 19/70* (2014.11)

(56) References Cited

OTHER PUBLICATIONS

Luo et al., "CE2-related: Prediction refinement with optical flow for affine mode", Joint Video Experts Team (JVET) of ITU-T SF 16 WP 3 and ISO/IEC JTC 1/SC 29/WG 11, Document: JVET-N0236-r1, 14th Meeting: Geneva, Switzerland, Mar. 19, 2019, 7 pages.

Chuang et al., "EE2-related: A simplified gradient filter for Bi-directional optical flow (BIO)", Joint Video Exploration Team (JVET) of ITU-T Sg 16 WP 3 and ISO/IEC JT 1/SC 29/WG 11, Document: JVET-G0083, 7th Meeting: Torino, Italy, Jul. 13, 2017, 5 pages.

Chen et al., Algorithm description for Versatile Video Coding and Test Model 4 (VTM 4), Joint Video Experts Team (JVET) of ITU-T SG 16 WP 3 and ISO/IEC JT 1/SC 29/WG 11, Document: JVET-M1002-v2; 13th Meeting: Marrakech, Morocco, Jan. 9, 2019, 62 pages.

Chen et al., "Non-CE9: Block Boundary Prediction Refinement with Optical Flow for DMVR", Document: JVET-O0581, Joint Video Experts Team (JVET) of ITU-T SG 16 WP 3 and ISO/IEC JTC 1/SC 29/WG 11, Jul. 3, 2019, 5 pages.

Luo et al., "CE2-related: Prediction refinement with optical flow for affine mode", Document: JVET-N0236-r5, Joint Video Experts Team (JVET) of ITU-T SG 16 WP 3 and ISO/IEC JTC 1/SC 29/WG 11, 14th Meeting: Gevena, CH, Mar. 19-27, 2019, 9 pages.

\* cited by examiner

METHOD AND APPARATUS FOR VIDEO ENCODING AND DECODING WITH OPTICAL FLOW BASED ON BOUNDARY SMOOTHED MOTION COMPENSATION

This application claims the benefit, under 35 U.S.C. § 365 of International Application PCT/US2020/028074, filed Apr. 14, 2020, which was published in accordance with PCT Article 21(2) on Oct. 22, 2020, in English, and which claims the benefit of European Patent Application No. 19305508.4, filed Apr. 18, 2019.

TECHNICAL FIELD

At least one of the present embodiments generally relates to, e.g., a method or an apparatus for video encoding or decoding, and more particularly, to a method or an apparatus comprising refining inter-prediction of an image block using optical flow based on boundary smoothed motion compensation.

BACKGROUND

The domain technical field of the one or more implementations is generally related to video compression. At least some embodiments relate to improving compression efficiency compared to existing video compression systems such as HEVC (HEVC refers to High Efficiency Video Coding, also known as H.265 and MPEG-H Part 2 described in "ITU-T H.265 Telecommunication standardization sector of ITU (October 2014), series H: audiovisual and multimedia systems, infrastructure of audiovisual services—coding of moving video, High efficiency video coding, Recommendation ITU-T H.265"), or compared to under development video compression systems such VVC (Versatile Video Coding, a new standard being developed by JVET, the Joint Video Experts Team).

To achieve high compression efficiency, image and video coding schemes usually employ partitioning of an image, prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed into frequency-domain coefficients, the coefficients are quantized, and entropy coded. To reconstruct the video, the compressed data are decoded by inverse processes corresponding to the entropy decoding, inverse quantization, inverse transform, and prediction.

In order to improve video compression efficiency in terms of bitrate saving or complexity reduction, reducing block artifact is desirable. Since some block artifacts are for instance involved by block-based motion compensation, it is desirable to further adapt inter coding/decoding tools to refine inter-prediction.

SUMMARY

The purpose of the invention is to overcome at least one of the disadvantages of the prior art.

For this purpose, according to a general aspect of at least one embodiment, a method for refining inter-prediction of an image block using optical flow based on boundary smoothed motion compensation is presented. The term "inter-prediction" is intended to be a broad term covering any motion compensation based prediction including, according to a non-limiting example, the Intra Block Copy prediction mode of VVC. Any prediction based on motion compensation is compatible with the present principles.

According to another general aspect of at least one embodiment, a method for encoding a block in an image encoding is presented. The method comprises inter-prediction refinement of the image block using optical flow based on boundary smoothed motion compensation.

According to another general aspect of at least one embodiment, a method for decoding a block of an image is presented comprising inter-prediction refinement of the image block using optical flow based on boundary smoothed motion compensation.

According to another general aspect of at least one embodiment, an apparatus for video encoding is presented comprising means for implementing any one of the embodiments of the encoding method.

According to another general aspect of at least one embodiment, an apparatus for video decoding is presented comprising means for implementing any one of the embodiments of the decoding method.

According to another general aspect of at least one embodiment, an apparatus for video encoding is provided comprising one or more processors, and at least one memory. The one or more processors is configured to implement to any one of the embodiments of the encoding method.

According to another general aspect of at least one embodiment, an apparatus for video decoding is provided comprising one or more processors and at least one memory. The one or more processors is configured to implement to any one of the embodiments of the decoding method.

According to another general aspect of at least one embodiment, the optical flow is based on a motion information for the block, a motion information of the top neighboring block, a motion information of the left neighboring block, and on motion information weighting factors.

According to another general aspect of at least one embodiment, a motion information for the block, a motion information for the top neighboring block and a motion information for the left neighboring block are obtained; and a new motion information for the block is determined from a weighted sum of the motion information for the block, the motion information for the top neighboring block, and the motion information for the left neighboring block using motion information weighting factors; a refined inter-prediction for the image block is obtained by determining an optical flow based on the new motion information for the block.

According to another general aspect of at least one embodiment, the refined inter-prediction for the image block is obtained for the boundary sub-blocks of the causal border of the image block.

According to another general aspect of at least one embodiment, the image block has a sub-block motion field and the inter-prediction refinement is performed for any sub-block the image block.

According to another general aspect of at least one embodiment, the image block has a sub-block motion field and the inter-prediction refinement of the image block uses optical flow based on boundary smoothed motion compensation and further based on sub-block motion field.

According to another general aspect of at least one embodiment, the inter-prediction refinement of the image block is enabled at block level or sub-block level responsive to a size of the block being larger than a value or to an inter prediction mode of the block.

According to another general aspect of at least one embodiment, the inter-prediction refinement of the image block is enabled at block level, sub-block level by inserting in the signaling syntax elements a flag that enable to identify the block or sub-block to which the inter-prediction refinement is applied.

According to another general aspect of at least one embodiment, motion information weighting factors are derived from at least one of availability of motion information, a set of stored weighting factors and a distance between the inter-prediction to refine and motion information of the neighboring block.

According to another general aspect of at least one embodiment, a non-transitory computer readable medium is presented containing data content generated according to the method or the apparatus of any of the preceding descriptions.

According to another general aspect of at least one embodiment, a signal or a bitstream is provided comprising video data generated according to the method or the apparatus of any of the preceding descriptions.

One or more of the present embodiments also provide a computer readable storage medium having stored thereon instructions for refining inter-prediction, encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

The various embodiments are described with respect to the encoding/decoding of an image. They may be applied to encode/decode a part of image, such as a slice or a tile, a tile group or a whole sequence of images.

Various methods are described above, and each of the methods comprises one or more steps or actions for achieving the described method. Unless a specific order of steps or actions is required for proper operation of the method, the order and/or use of specific steps and/or actions may be modified or combined.

At least some embodiments relate to refining inter-prediction of an image block using optical flow based on boundary smoothed motion compensation. Advantageously, an optical flow-based correction is derived using motion information of boundary blocks, thus smoothing artefact at block boundaries. Advantageously, the optical flow-based correction is derived for a partition of a block (sub-block), thus smoothing artefact at sub-block boundaries inside a block.

In the following, we describe generic embodiments useful to the understanding of the present principles and in which the present principles can be implemented. Then, we disclose several embodiments of the optical flow based on boundary smoothed motion compensation. Finally, we disclose additional information and generic embodiments.

In HEVC, motion compensated temporal prediction is employed to exploit the redundancy that exists between successive pictures of a video.

Figure 1:
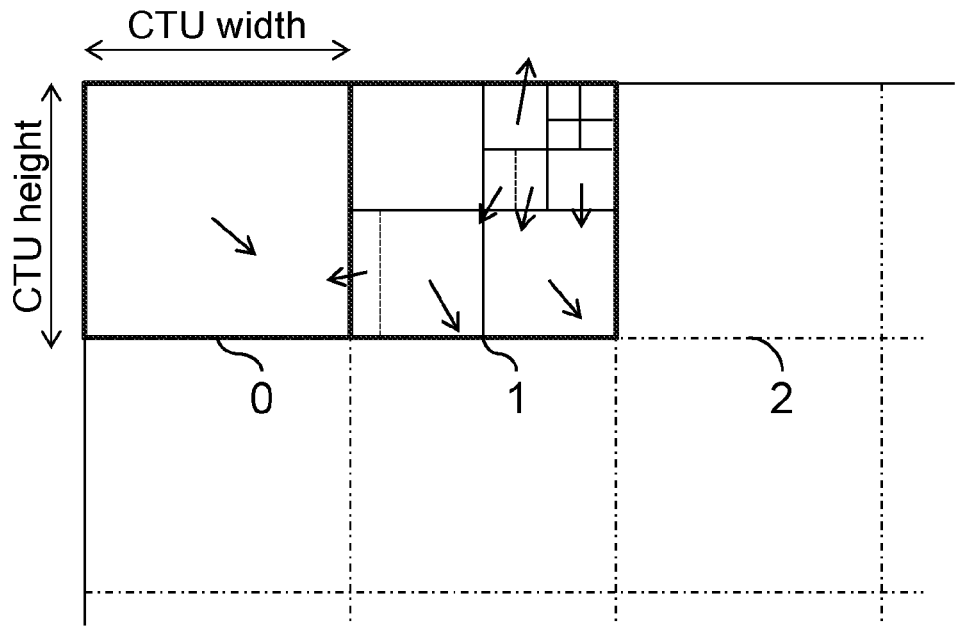
FIG. 1 illustrates of Coding Tree Unit (CTU) and Coding Tree (CT) concepts to represent a compressed HEVC picture.

FIG. 1 illustrates of Coding Tree Unit (CTU) and Coding Tree (CT) concepts to represent a compressed HEVC picture. In an HEVC encoder, the picture is partitioned into large blocks (CTU). Each CTU is represented by a Coding Tree based on recursive quad-tree or binary tree divisions of the CTU, where each leaf is called a Coding Unit (CU) as illustrated on FIG. 1. Each CU is predicted with one or more Prediction Unit (PU) and is then given some Intra or Inter prediction parameters (Prediction Info).

Figure 2:
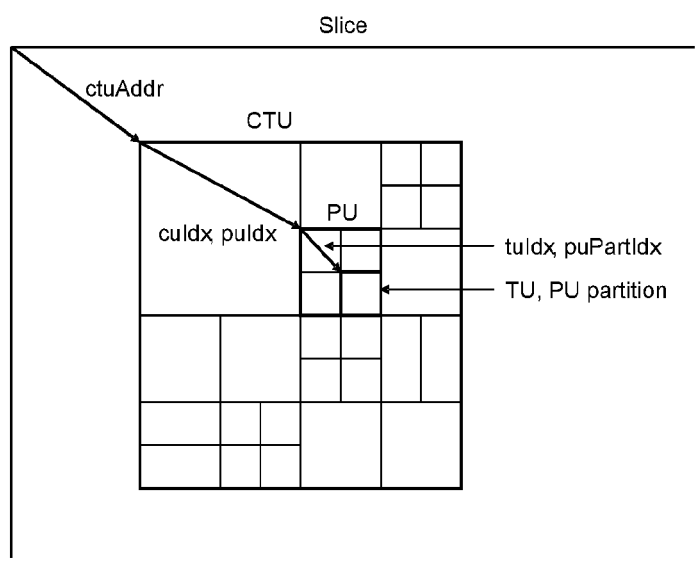
FIG. 2 illustrates an example of division of a Coding Tree Unit into Coding Units, Prediction Units and Transform Units.

FIG. 2 illustrates an example of division of a Coding Tree Unit into Coding Units, Prediction Units and Transform Units. The Intra or Inter coding mode is assigned on the CU level as shown on FIG. 2. Exactly one Motion Vector is assigned to each PU in HEVC. This motion vector is used for motion compensated temporal prediction of the considered PU. Therefore, in HEVC, the motion model that links a predicted block and its reference block simply consists in a translation.

In the latest development of VVC, a PU can contain sub-block motion (e.g. 4×4 square sub-block) using common parametric motion model (e.g. affine mode) or using stored temporal motion (e.g. Sub-block Temporal Motion Vector Predictor SbTMVP aka ATMVP).

Figure 3:
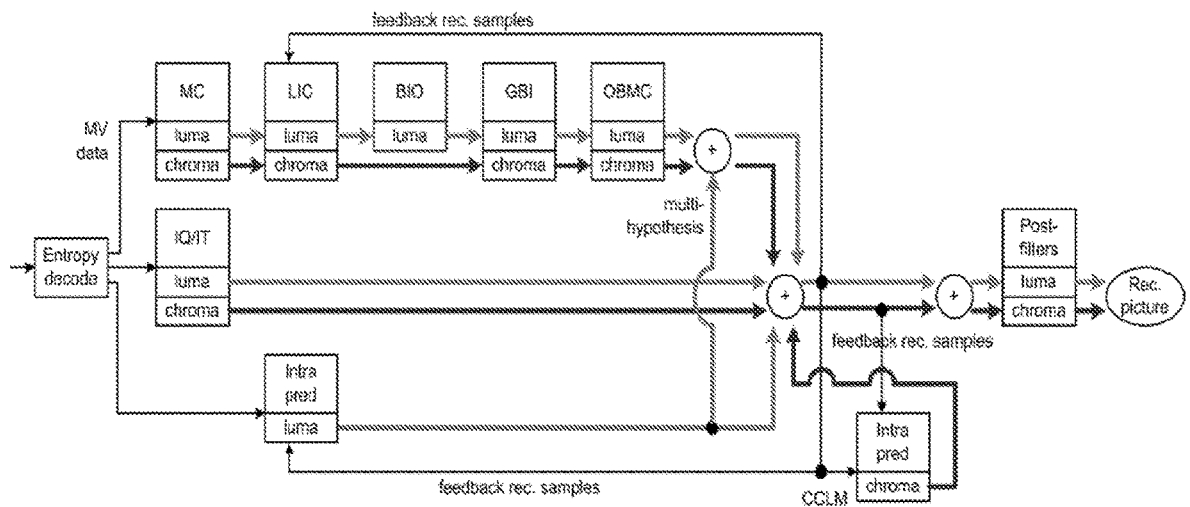
FIG. 3 illustrates a flowchart of a method for obtaining an inter-predicted block according to a particular embodiment.

FIG. 3 illustrates a flowchart of a method for obtaining an inter-predicted block according to a particular embodiment. A non-limiting example of a pipeline used to construct a block of an image is illustrated. According to variant embodiments, some of the stages are by-passed. For instance, stages LIC and OBMC are by-passed. According to other variant embodiments, additional stages, not represented on FIG. 3 are added. For instance, PROF is added. Regarding the decoding of inter-predicted block, the following processes have been studied for the development of VVC:

MC: motion compensation (either by block or sub-block);
LIC: Local Illumination Compensation. Change the predicted samples values using a linear adaptation.
BIO or BDOF: Bi-Directional prediction Optical Flow. Change the predicted samples values using the result of an optical flow estimation between the 2 reference blocks used to reconstruct the block. This tool is described hereafter with more details.
DMVR: decoder-side motion vector refinement (not shown in FIG. 3): refine the motion vectors inside a PU at decoder side for bi-directional prediction.
GBI Generalized bi-prediction, also referred to as BCW Bi-prediction with CU-level Weight: weighted average of the 2 reference blocks used to reconstruct the block.
OBMC: Overlapped Block Motion Compensation. Weighted average of motion compensated blocks using different motion vectors from neighboring blocks. This tool is described hereafter with more details.
IQ/IT: inverse quantization and transform used to reconstruct a residual.

Intra prediction: used to predict a block using surrounding samples values
Multi-Hypothesis or CIIP Combined Inter/Intra Prediction: merge together several predictions (typically inter and intra) using a weighted average depending on the position. Also extend to triangular multi-hypothesis where several inter prediction can be merged inside a block.
CCLM: Cross Components Linear Model. Use another already reconstructed component to predict the current component using a linear model.

Figure 4:
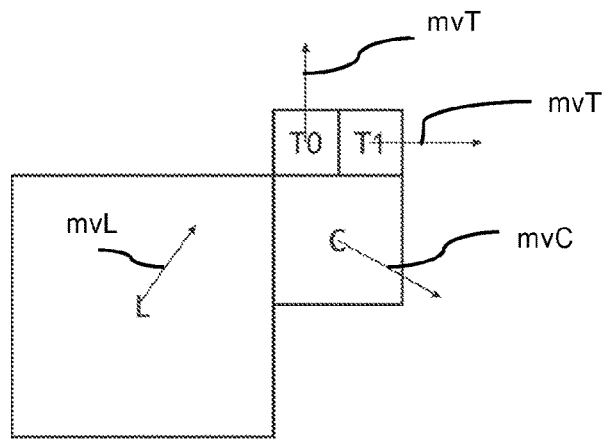
FIG. 4 illustrates an example of overlapped block motion compensation according to a particular embodiment.
Figure 4:
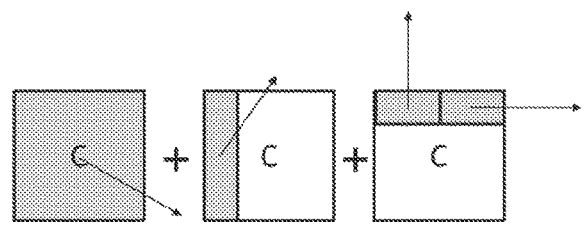

FIG. 4 illustrates an example of overlapped block motion compensation according to a particular embodiment. The overlapped block motion compensation was not adopted by VVC however the OMBC was studied in test model. According to the test model, the motion compensation step was followed, for all Inter CUs whatever their coding mode, by a process called OBMC for Overlapped Block Motion Compensation that aims at attenuating the motion transitions between CUs (somehow like the deblocking filter with the blocking artifacts). However, this method requires several motion compensations by PU or sub-blocks, which increase the memory bandwidth requirement of the decoder. The present principles describe a refinement of inter-prediction thus advantageously avoiding the multiples motion compensations of OBMC. However, as OBMC, the present principles advantageously apply to both sub-block PU or non-sub-block PU.

The basic principle of OBMC for a block based OBMC, using top and left blocks are illustrated on FIG. 4:
The current block C is first motion compensated with the motion vector of the current block,
The left band of the current block C is motion compensated with the motion vector of the left block neighbor L,
The top band of the current block C is motion compensated using the motion vectors of the top block neighbors T0 and T1,
A weighted sum (either at block level or pixels levels) is then performed in order to compute the final motion compensated block.

The OBMC process for a current block is performed during the reconstruction of this current block. It means that the parameters needed to perform the motion compensation of each band of current block need to be saved in each neighboring block.

The VVC specification comprises 2 tools for prediction refinement of inter prediction that refine motion compensation at pixel level based on Optical Flow concept. The Optical Flow concept relies on 2 assumptions. Firstly, the motion of an object is smooth and, secondly, prediction sample is refined by adding a motion refinement derived by the optical flow equation. A first tool is bi-directional optical flow BDOF that performs a temporal optical flow to obtain refined inter-prediction. A second tool is prediction refinement with optical flow PROF that performs a spatial optical flow to obtain refined inter-prediction.

BDOF is used to refine the bi prediction of a block or CU at the 4×4 subblock level by minimizing the difference between the L0 and L1 prediction samples. BDOF was simplified during the development of VVC, such that the simpler version of BDOF requires much less computation, especially in terms of number of multiplications and the size of the multipliers. BDOF is applied to a CU if it satisfies the following conditions:

1) the CU's height is not 4, and the CU is not in size of 4×8, 2) the CU is not coded using affine mode or the sbTMVP merge mode;
3) the CU is coded using "true" bi-prediction mode, i.e., one of the two reference pictures is prior to the current picture in display order and the other is after the current picture in display order.

BDOF is only applied to the luma component.

As its name indicates, the BDOF mode is based on the optical flow concept, which assumes that the motion of an object is smooth and its luminance is constant along the considered time interval. For each 4×4 sub-block, a motion refinement ($v_x$, $v_y$) is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i,j) \text{ and } \frac{\partial I^{(k)}}{\partial y}(i,j), k = 0, 1,$$

of the two prediction signals are computed by directly calculating the difference between two neighboring samples, i.e., $$\frac{\partial I^{(k)}}{\partial x}(i,j) = \left(I^{(k)}(i+1,j) - I^{(k)}(i-1,j)\right) \gg 4 \quad (3\text{-}1)$$

$$\frac{\partial I^{(k)}}{\partial y}(i,j) = \left(I^{(k)}(i,j+1) - I^{(k)}(i,j-1)\right) \gg 4$$

where $I^{(k)}(i,j)$ are the sample value at coordinate (i,j) of the prediction signal in list k, k=0,1. Then, the auto- and cross-correlation of the gradients, $S_1$, $S_2$, $S_3$, $S_5$ and $S_6$, are calculated as $S_1 = \sum_{(i,j) \in \Omega} \psi_x(i,j) \cdot \psi_x(i,j), S_3 = \sum_{(i,j) \in \Omega} \theta_x(i,j) \cdot \psi_x(i,j)$ $S_2 = \sum_{(i,j) \in \Omega} \psi_x(i,j) \cdot \psi_x(i,j)$ $S_5 = \sum_{(i,j) \in \Omega} \psi_x(i,j) \cdot \psi_x(i,j) S_6 = \sum_{(i,j) \in \Omega} \theta_x(i,j) \cdot \psi_x(i,j)$ (3-2)

Where:

$$\psi_x(i,j) = \left(\frac{\partial I^{(1)}}{\partial x}(i,j) + \frac{\partial I^{(0)}}{\partial x}(i,j)\right) \gg n_a \quad (3\text{-}3)$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = \left(I^{(1)}(i,j) \gg n_b\right) - \left(I^{(0)}(i,j) \gg n_b\right)$$

where $\Omega$ is a 6×6 window surrounding the 4×4 sub-block.

The motion refinement ($v_x$, $v_y$) is then derived using the cross- and auto-correlation terms using the following:

$$v_x = S_1 > 0 ? \text{clip3}\left(-th'_{BIO}, th'_{BIO}, -\left((S_3 \cdot 2^{n_b - n_a}) \gg \lfloor \log_2 S_1 \rfloor\right)\right) : 0 \quad (3\text{-}4)$$

$v_y = S_5 > 0 ? \text{clip3}$ $\left(-th'_{BIO}, th'_{BIO}, -\left((S_6 \cdot 2^{n_b - n_a} - ((v_x S_{2,m}) \ll n_{S_2} + v_x S_{2,s})/2) \gg \lfloor \log_2 S_5 \rfloor\right)\right) : 0$ where $S_{2,m} = S_2 \gg n_{S_2}$, $S_{2,s} = S_2 \& (2^{n_{S_2}} - 1)$, $th'_{BIO} = 2^{13-BD}$.

and $\lfloor \cdot \rfloor$ is the floor function.

Based on the motion refinement and the gradients, the following adjustment is calculated for each sample in the 4×4 sub-block:

$$b(x,y) = rnd\left(\left(v_x\left(\frac{\partial I^{(1)}(x,y)}{\partial x} - \frac{\partial I^{(0)}(x,y)}{\partial x}\right)\right)/2\right) + \quad (3\text{-}5)$$

$$rnd\left(\left(v_y\left(\frac{\partial I^{(1)}(x,y)}{\partial y} - \frac{\partial I^{(0)}(x,y)}{\partial y}\right)\right)/2\right)$$

Finally, the BDOF samples of the CU are calculated by adjusting the bi-prediction samples as follows:

$\text{pred}_{BDOF}(x,y) = (I^{(0)}(x,y) + I^{(1)}(x,y) + b(x,y) + o_{offset}) \gg \text{shift}$ (3-6)

In the above, the values of $n_b$, $n_b$ and $n_{S_2}$ are equal to 3, 6, and 12, respectively. These values are selected such that the multipliers in the BDOF process do not exceed 15-bit, and the maximum bit-width of the intermediate parameters in the BDOF process is kept within 32-bit.

Figure 5:
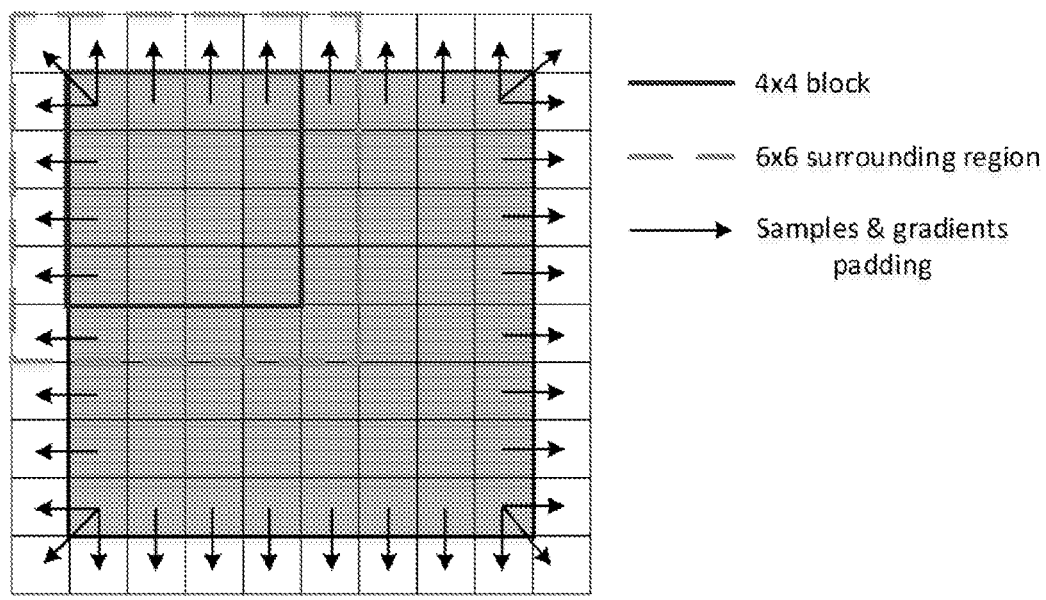
FIG. 5 illustrates an example of an extended CU region used in a bi-directional optical flow according to a particular embodiment.

In order to derive the gradient values, some prediction samples $I^{(k)}(i,j)$ in list k (k=0,1) outside of the current CU boundaries need to be generated. As depicted in FIG. 5, the simpler version of BDOF uses one extended row/column around the CU's boundaries. In order to control the computational complexity of generating the out-of-boundary prediction samples, bilinear filter is used to generate prediction samples in the extended area (white positions), and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e. repeated) from their nearest neighbors. Bi-directional Optical flow (BDOF) is sample-wise motion refinement which is performed on top of block-wise motion compensation for bi-prediction. The sample-level motion refinement doesn't use signaling. In case of bi-prediction, the goal of BDOF is to refine motion for each sample assuming linear displacement in-between the two reference pictures and based on Hermite's interpolation of the optical flow.

Figure 6:
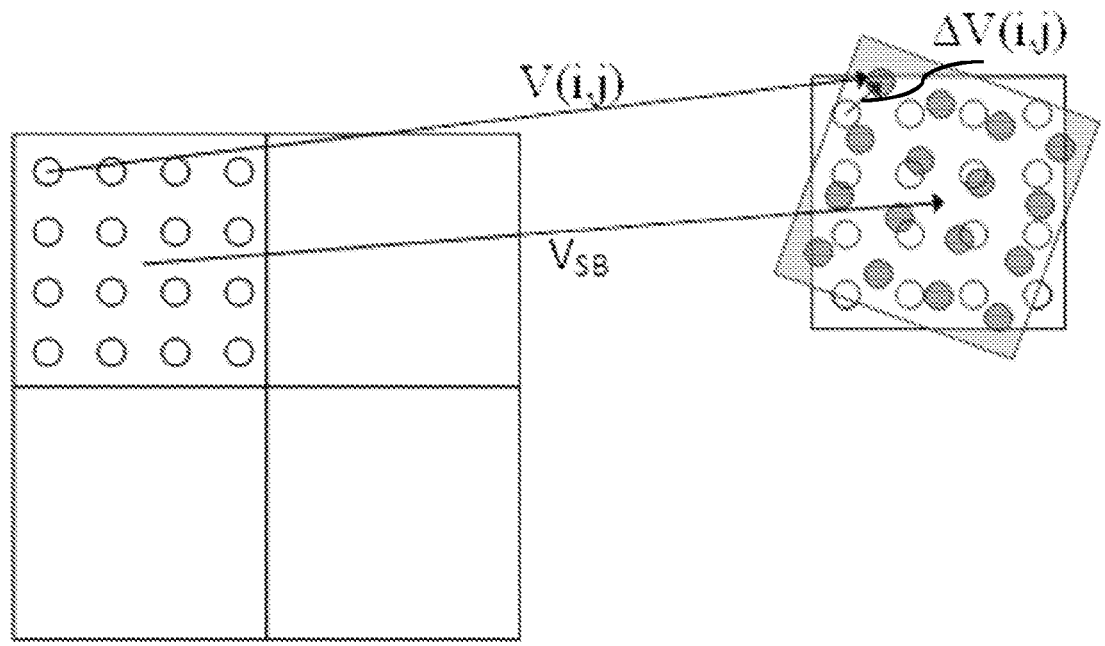
FIG. 6 illustrates an example of optical flow-based motion refinement flow according to a particular embodiment.

A second tool adopted in VVC is an optical flow-based motion refinement to correct the block based affine motion compensation called Prediction refinement with optical flow or PROF. FIG. 6 illustrates an example of optical flow-based motion refinement flow according to a particular embodiment. To achieve a finer granularity of motion compensation, this tool proposes a method to refine the sub-block based affine motion compensated prediction with spatial optical flow. After the sub-block based affine motion compensation is performed, luma prediction sample is refined by adding a difference derived by the optical flow equation. PROF is described as following four steps.

Step 1) The sub-block-based affine motion compensation is performed to generate sub-block prediction I(i, j).

Step 2) The spatial gradients $g_x(i,j)$ and $g_y(i,j)$ of the sub-block prediction are calculated at each sample location using a 3-tap filter [−1, 0, 1].

$g_x(i,j) = I(i+1,j) - I(i-1,j)$ $g_y(i,j) = I(i,j+1) - I(i,j-1)$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Step 3) The luma prediction refinement is calculated by the optical flow equation.

$$\Delta I(i,j) = g_x(i,j) * \Delta v_x(i,j) + g_y(i,j) * \Delta v_y(i,j)$$

where the $\Delta v(i, j)$ is the difference between pixel MV computed for sample location (i,j), denoted by v(i,j), and the sub-block MV $V_{SB}$ of the sub-block to which pixel (i,j) belongs, as shown in FIG. 6. Since the affine model parameters and the pixel location relative to the sub-block center are not changed from sub-block to sub-block, $\Delta v(i,j)$ can be calculated for the first sub-block, and reused for other sub-blocks in the same CU. Let x and y be the horizontal and vertical offset from the pixel location to the center of the sub-block, $\Delta v(x, y)$ can be derived by the following equation, $$\begin{cases} \Delta v_x(x, y) = c * x + d * y \\ \Delta v_y(x, y) = e * x + f * y \end{cases}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i, j). The final prediction I' is generated as the following equation: I'(i, j)=I(i, j)+$\Delta$I(i, j).

Figure 7:
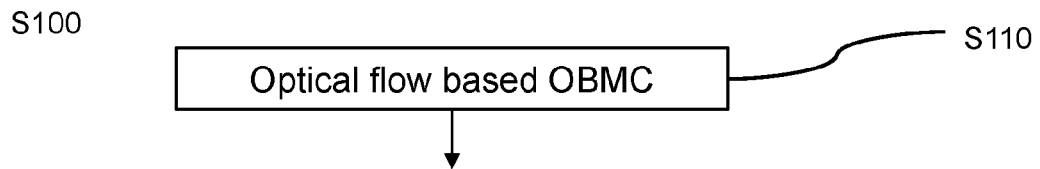
FIG. 7 illustrates a flowchart of a method for refining inter-prediction of an image block using optical flow based on boundary smoothed motion compensation according to a particular embodiment.

FIG. 7 illustrates a flowchart of a method for refining inter-prediction of an image block using optical flow based on boundary smoothed motion compensation according to a particular embodiment. As explained above, if the OBMC process aims at attenuating the motion transitions between CUs, it is applied on the fly when reconstructing a particular block and requires several motion compensations which raises memory bandwidth requirement issue in the decoder. It is desirable to find a method that would smooth artifact at block boundaries, as OBMC, at lower implementation complexity. To that end, the present principles disclose refining inter-prediction of an image block using optical flow based boundary smoothed motion compensation. According to a variant wording, a method for motion compensated prediction refinement using optical flow based OBMC is now disclosed. Unlike already known optical flow-based methods, for instance BDOF and PROF used to refine a given prediction (temporal or affine), the present principles discloses an alternative optical flow method that smooths artifact at block boundaries. In the following, the term optical flow based boundary smoothed motion compensation and the term optical flow based overlapped block motion compensation may be used indifferently.

Thus, as illustrated on FIG. 7, the method for refining inter-prediction S100 of an image block comprises a step S110 of optical flow based OMBC. Advantageously, the at least one generic embodiment of the method for refining inter-prediction S100
- derives an optical flow prediction refinement on boundary blocks by using only motion information;
- applies this refinement conditionally based on some fixed conditions, or signals the application of the refinement;
- applies the refinement at CU, sub-block (4×4) or bigger block (eg 16×16) level.

Advantageously, the at least one generic embodiment of the method for refining inter-prediction S100 removes block artifact from motion compensation using a single motion compensation. Indeed, the refinement of each boundary sub-block is done using a process derived from the optical flow concept.

Figure 8:
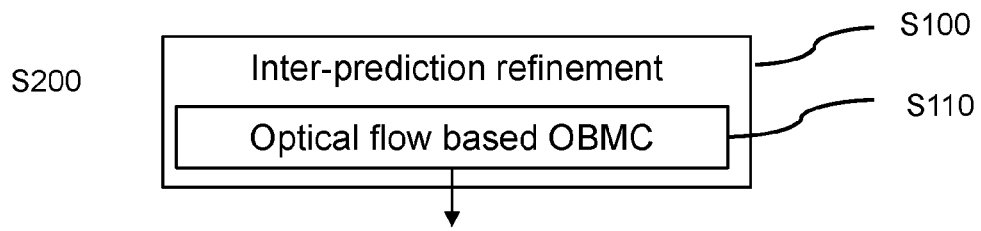
FIG. 8 illustrates a flowchart of a method for decoding a block of an image according to a particular embodiment.

According to another general aspect of at least one embodiment, a method for decoding a block of an image is presented comprising inter-prediction refinement of the image block using optical flow based on boundary smoothed motion compensation. FIG. 8 illustrates a flowchart of a method for decoding a block of an image according to a particular embodiment. Thus, the inter-prediction refinement S100 according to any of its variants is implemented in a decoding method S200.

Figure 9:
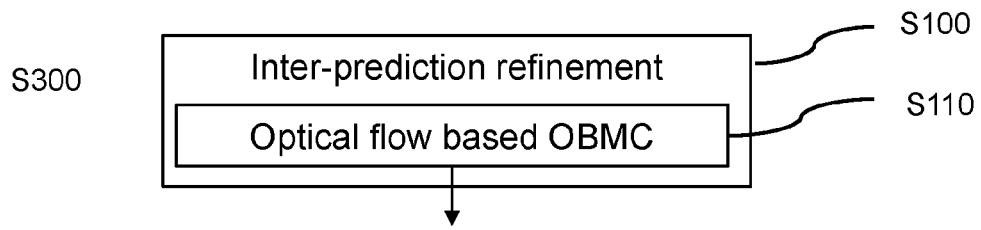
FIG. 9 illustrates a flowchart of a method for encoding a block of an image according to a particular embodiment.

According to another general aspect of at least one embodiment, a method for encoding a block in an image encoding is presented. The method comprises inter-prediction refinement of the image block using optical flow based on boundary smoothed motion compensation. FIG. 9 illustrates a flowchart of a method for encoding a block of an image according to a particular embodiment. Similarly, the inter-prediction refinement S100 according to any of its variants is implemented in an encoding method S300.

According to a first variant, the at least one embodiment of the optical flow based on boundary smoothed motion compensation is only applied to the luma component. According to a second variant, the at least one embodiment of the optical flow based on boundary smoothed motion compensation is applied to the chroma component.

Figure 10:
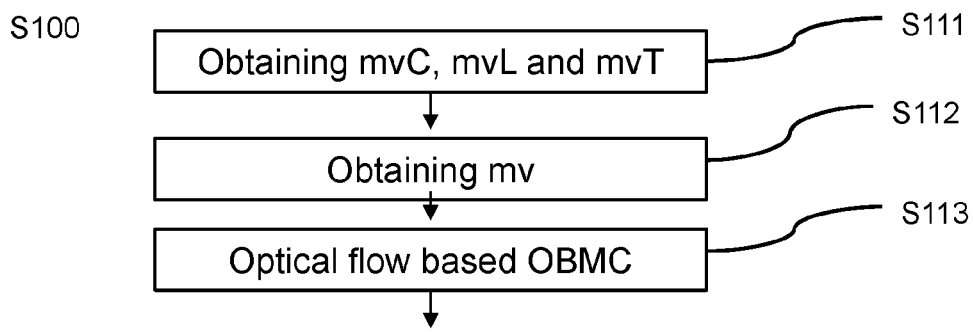
FIG. 10 illustrates a flowchart of a method for refining inter-prediction of an image block using optical flow based on boundary smoothed motion compensation according to another particular embodiment.

FIG. 10 illustrates a flowchart of a method for refining inter-prediction of an image block using optical flow based on boundary smoothed motion compensation according to another particular embodiment. For each block C as shown in FIG. 4, in a first step S111, a motion information for the block, a motion information of the top neighboring block, a motion information of the left neighboring block is obtained from memory. That is, at least the motion vector of the current block mvC, the motion vector of a top block mvT and the motion vector of the left block mvL are retrieved. Then at step S112, a new pixel-wise motion vector mv(i,j) is computed as the weighted sum of the 3 motion vectors mvC, mvT and mvL with mv(i,j)=a(i,j)*mvC(i,j)+b(i,j)*mvT(i,j)+c(i,j)*mvL(i,j) wherein the relative weights a(i,j), b(i,j) and c(i,j) are responsive to the pixel distance from the neighboring block. Then in a step S113, an optical flow based refinement is obtained for each pixel of the block based on the difference $\Delta$mv(i,j) between the new motion vector and the motion vector of the current block, the difference being computed by $\Delta$mv(i,j)=mv(i,j)−mvC(i,j) for the pixel(i,j). According to a particular embodiment, the different steps S11, S112 and S113 of the method for refining inter-prediction are performed on sub-blocks since in particular examples where motion fields are defined, the motion information varies for each sub-block in a block. Advantageously, the boundary artifact inside the block are thus smoothed. In the following various features and embodiments are described.

Figure 11:
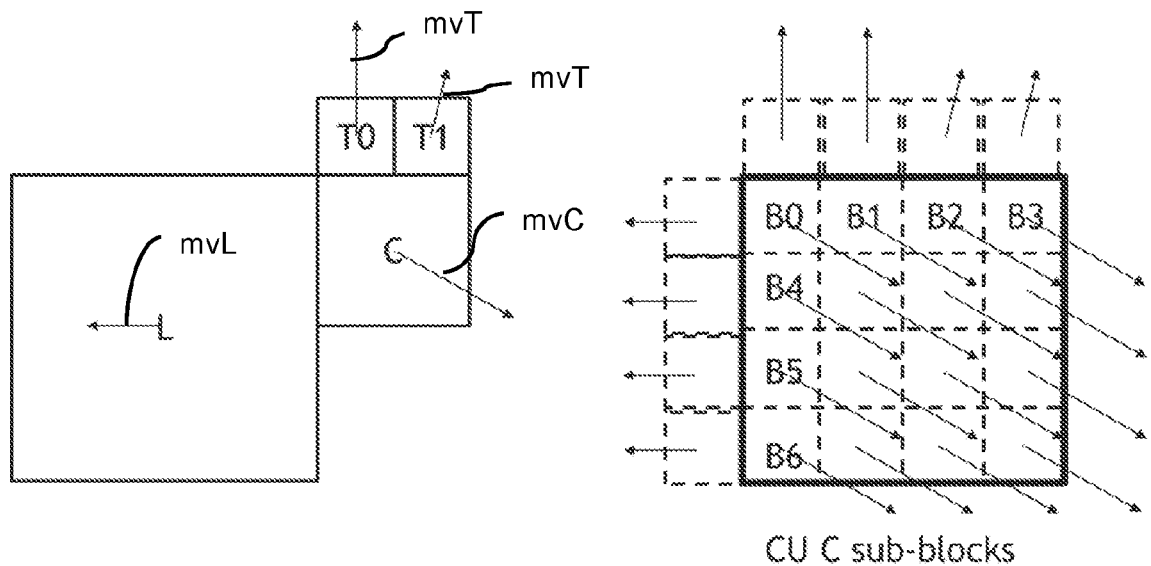
FIG. 11 illustrates an example sub-block motion field to which is applied a method for refining inter-prediction of an image block using optical flow based on boundary smoothed motion compensation according to another particular embodiment.
Figure 13:
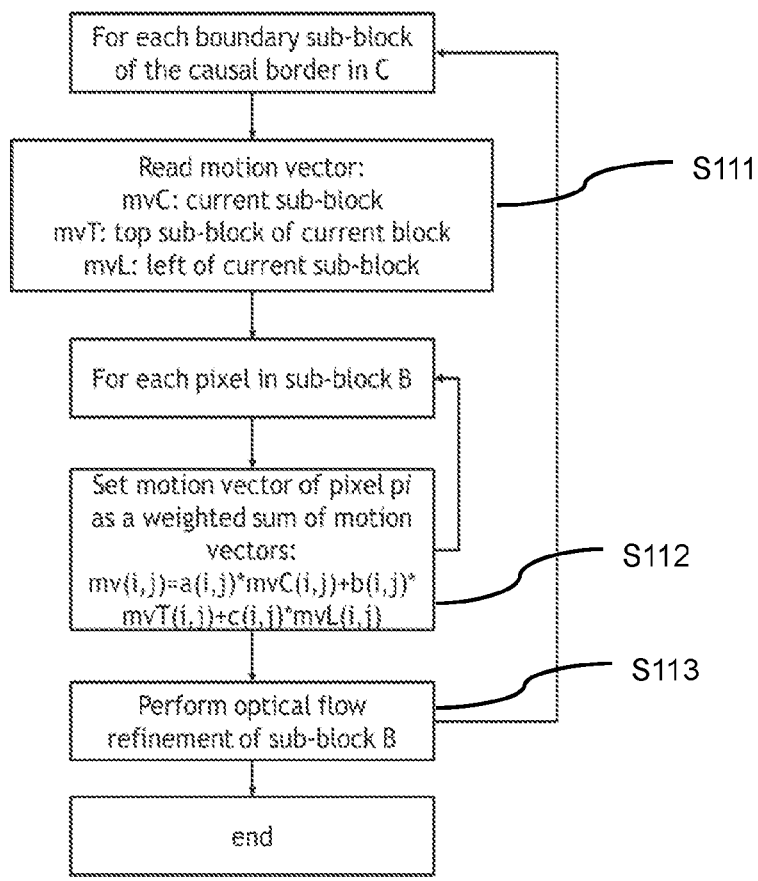
FIG. 13 illustrates a flowchart of an Optical Flow based on boundary smoothed motion compensation method according to a particular embodiment.

FIG. 11 illustrates an example sub-block motion field to which is applied a method for refining inter-prediction of an image block using optical flow based on boundary smoothed motion compensation according to another particular embodiment. According to this embodiment, the refined inter-prediction for the image block is obtained for the boundary sub-block of the causal border of the image block. FIG. 13 illustrates an exemplary flowchart of an Optical Flow based on boundary smoothed motion compensation method according to this particular embodiment. For each sub-block (4×4) of the causal border inside a CU C, for instance sub-blocks B0 to B6 on FIG. 11, the overall process shown in FIG. 13 is performed. The process is performed on all prediction (either L0 or L1 for uni-directional prediction, or both for bi-prediction).

For each sub-block B0 to B6, in a step S111 the current mvC, top mvT and left mvL motion vector of the current sub-block is extracted. In the following, various embodiments for my extraction or retrieval are disclosed.

Figure 12:
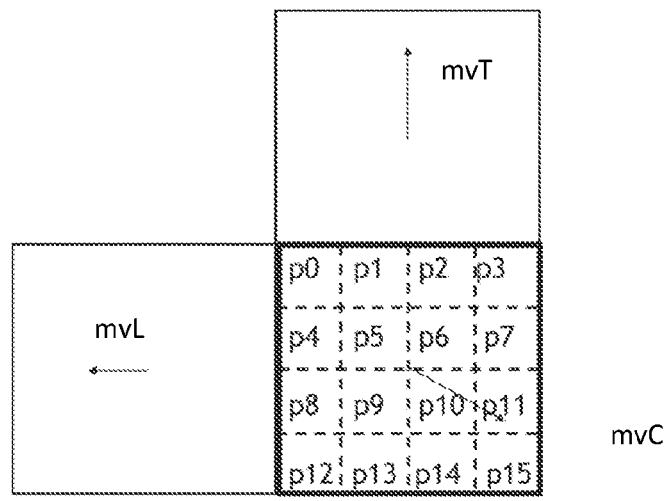
FIG. 12 illustrates an example of Sub-block B0 and its neighboring motion vectors.

In a step S112, for each pixel inside the current sub-block B as illustrated for example on FIG. 12 with sub-block B0), a new motion vector mv(i,j) is computed as the weighted sum of the 3 motion vectors mvC, mvT and mvL: mv(i,j)=a(i,j)*mvC(i,j)+b(i,j)*mvT(i,j)+c(i,j)*mvL(i,j). In the following, various embodiments for obtaining the weighting factors are disclosed.

Figure 14:
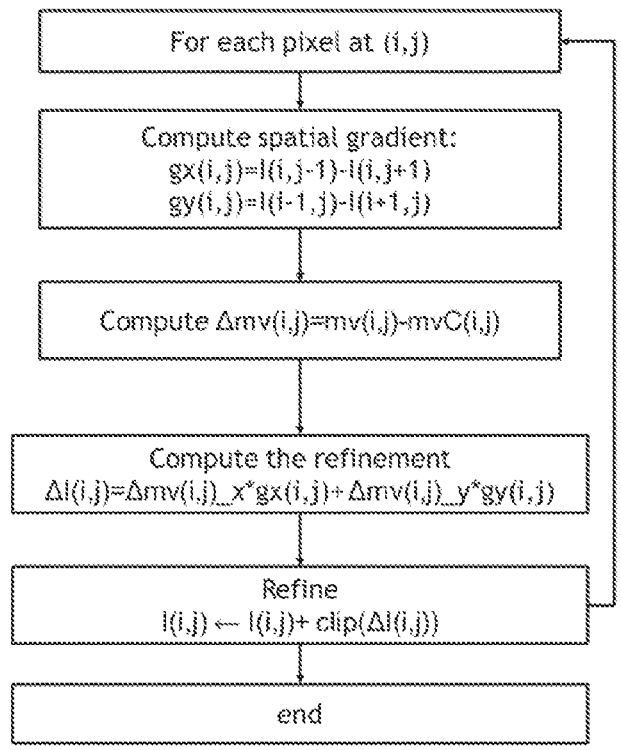
FIG. 14 illustrates a flowchart of an Optical Flow based on boundary smoothed motion compensation for a pixel at location (i,j) according to a particular embodiment.

In a step S113, an optical flow based refinement is then performed for each pixel of the sub-block. FIG. 14 illustrates a flowchart of an Optical Flow based on boundary smoothed motion compensation for a pixel at location (i,j) according to a particular embodiment:

Spatial gradients gx(I,j) and gy(I,j) for the sub-block are computed. The gradient is computed by enlarging the motion compensation by 1 pixel for each sub-block of the causal border inside the CU. According to some variants for computing the gradients:

A nearest pixel motion compensation for the pixel outside the block is performed to advantageously avoid complex interpolation filter.

If the current sub-block does not have sub-block motion vectors (i.e. is not affine of SbTMVP), right and bottom border outside the sub-block are copied from neighboring sub-block inside the CU.

The motion vector difference is computed Δmv(i,j)=mv(i,j)−mvC(i,j)

The refinement is computed ΔI(i,j)=Δmv(i,j)_x*gx(i,j)+Δmv(i,j)_y*gy(i,j), where I is the current prediction image, and Δmv(i,j)_x and Δmv(i,j)_y the x and y component of the motion vector difference Δmv(i,j)

The refined prediction is obtained by adding the clipped refinement to the prediction: I(i,j)←I(i,j)+clip(ΔI(i,j)).

The clipping function allows to limit the correction of the refinement in case of large gradient or motion. Typically the clip function is as follow: Clip(x): if x<−T then return T else if x>T return T lese return x.

The threshold T is fixed. A typical value is 8 for a 10 bits signal.

Thus a refined inter-prediction I is obtained using an optical flow based OMBC.

Figure 15:
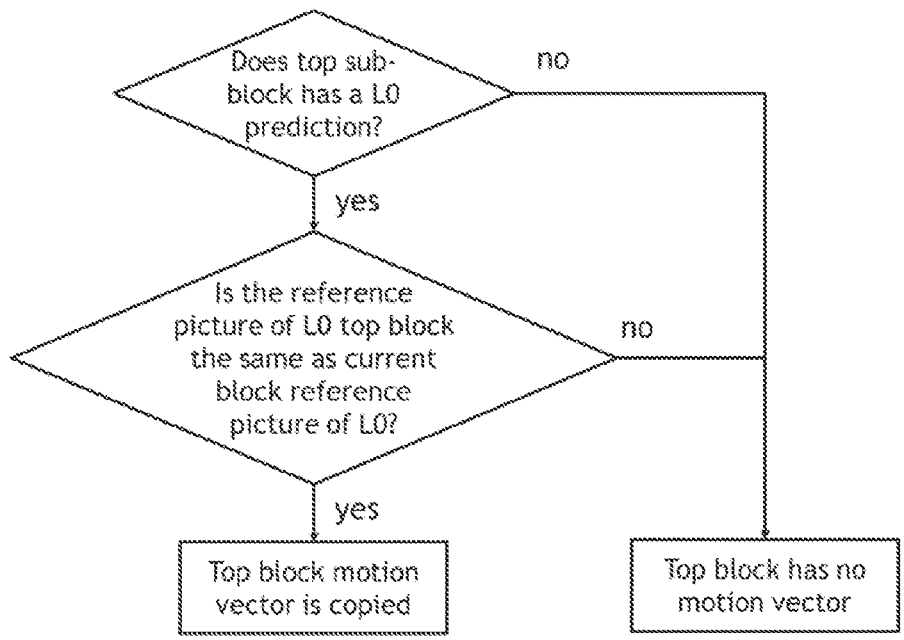
FIG. 15 illustrates a flowchart of a neighboring motion extraction for the top neighbors of the L0 list predictor according to a particular embodiment.

FIG. 15 illustrates a flowchart of a neighboring motion extraction for the top neighbors of the L0 list predictor according to a particular embodiment. The skilled in the art will easily derive a corresponding extraction for others neighboring blocks, for instance for the left neighbor. In a first step, the motion vector is extracted from list L0 if it exists. In case it does not exist, the motion vector mvT is set to zero value. If it exists, the reference picture is tested. In case the reference picture of L0 top block and the reference picture of the L0 current block are the same, the top block motion vector mvT extracted from list L0 for top block is stored for further use in optical flow based OBMC of the current block. In case they are distinct, the motion vector mvT is set to zero value. Besides, the motion vectors of top and left neighbors for list L1 is similar to the one of list L0. According to a variant embodiment, when the mvT does not exist, the motion vector mvT is not set to zero, but the weight b(i,j) associated with the missing motion vector mvT is set to zero thus resulting in zero weight contribution in the weighted sum of the corresponding top motion vector.

Figure 16:
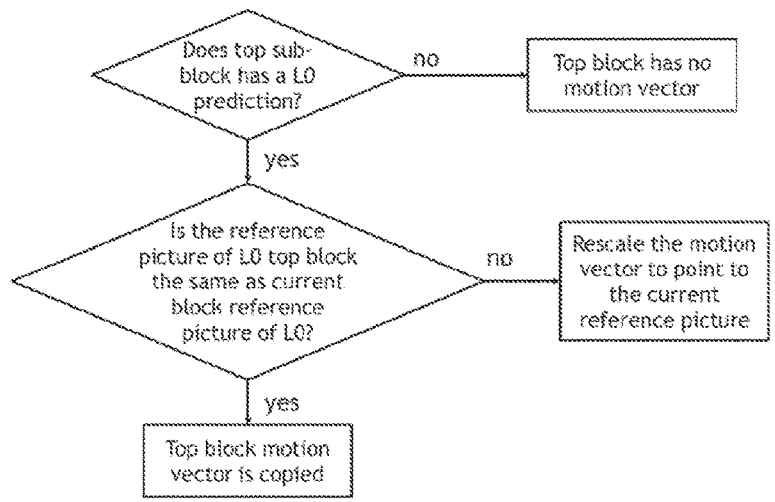
FIG. 16 illustrates an example of alternative neighboring motion extraction for the top neighbors of the L0 list predictor according to a particular embodiment.

According to a variant embodiment of the neighboring motion vector extraction, the motion vector is rescaled if the reference picture of the neighboring block does not point to the reference picture of the current block. FIG. 16 illustrates an example of alternative neighboring motion extraction for the top neighbors of the L0 list predictor according to a particular embodiment. As previously, in a first step, the motion vector is extracted from list L0 if it exists. If it exists, the reference picture is tested. In case the reference picture of L0 top block and the reference picture of the L0 current block are the same, the top block motion vector mvT extracted from list L0 for top block is stored for further use in optical flow based OBMC of the current block. In case they are distinct, the motion vector mvT from L0 is rescaled to point to the current reference picture based on pictures distance. Indeed, the rescaling process is the same as the one used to rescale motion vector predictor in standard Adaptive Motion Vector Prediction AMVP process. In case motion vector mvT is extracted from list L0 does not exist, the motion vector mvT, the motion vector mvT is set to zero value.

Figure 17:
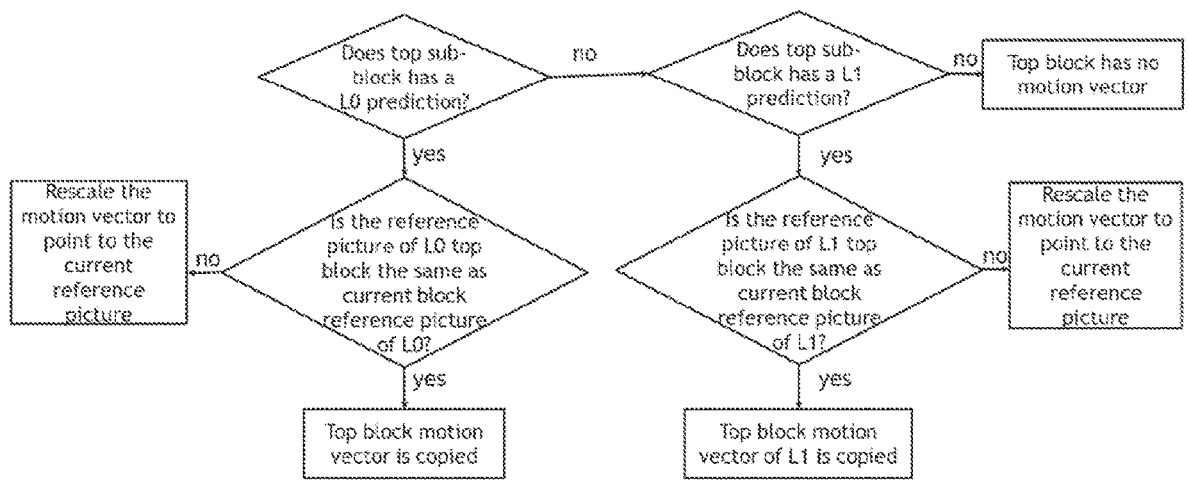
FIG. 17 illustrates another example of alternative neighboring motion extraction for the top neighbors of the L0 list predictor according to a particular embodiment.

According to yet another variant embodiment of the neighboring motion vector extraction, the motion vector the motion vector is additionally extracted from the other list (L1 in this example) if it does not exist in the current list (L0 in this example). FIG. 17 illustrates an example of alternative neighboring motion extraction for the top neighbors of the L0 list predictor according to a particular embodiment. As previously, the rescaling process is the same as the one used to rescale motion vector predictor in standard AMVP process. In a first step, the motion vector is extracted from list L0 if it exists. If it exists, the reference picture is tested. In case the reference picture of L0 top block and the reference picture of the L0 current block are the same, the top block motion vector mvT extracted from list L0 for top block is stored for further use in optical flow based OBMC of the current block. In case they are distinct, the motion vector mvT from L0 is rescaled to point to the current reference picture based on pictures distance. Indeed, the rescaling process is the same as the one used to rescale motion vector predictor in standard Adaptive Motion Vector Prediction AMVP process. In case motion vector mvT is extracted from list L0 does not exist, the motion vector mvT is extracted from list L1 if it exists. If motion vector mvT extracted from list L1 exists, the reference picture is tested. Similarly, in case the reference picture of L1 top block and the reference picture of the L1 current block are the same, the top block motion vector mvT extracted from list L1 for top block is stored for further use in optical flow based OBMC of the current block. In case reference pictures are distinct, the motion vector mvT from L1 is rescaled to point to the current reference picture. If motion vector mvT is extracted from list L1 does not exist, the motion vector mvT is set to zero value.

Figure 18:
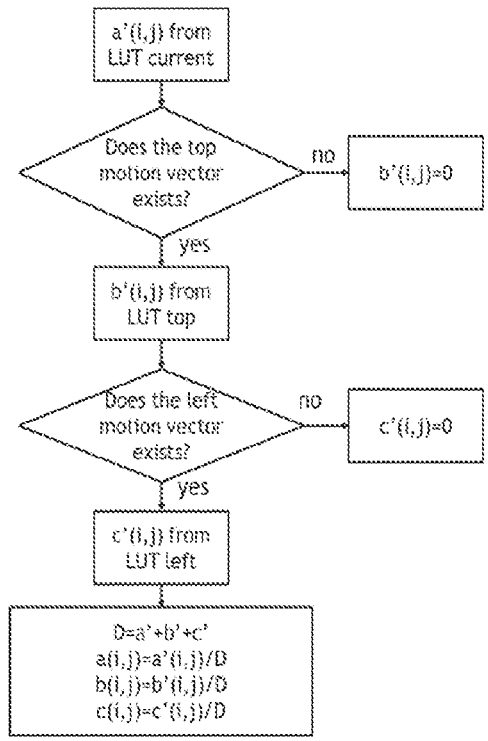
FIG. 18 illustrates a flowchart of a method for computing the weights of each motion vector according to a particular embodiment.

FIG. 18 illustrates a flowchart of a method for computing the weights of each motion vector according to a particular embodiment. For each motion vector, a weight of 0 is set if the motion vector is not present (as stated in previous embodiments for motion information extraction) or a given weight (as described below) if it exists. For instance, in case top motion vector does not exist, the weight b'(i,j) is set to zero. Similarly, in case left motion vector does not exist, the weight c'(i,j) is set to zero. Otherwise the given weight a'(i,j), b'(i,j) and c'(i,j) are for instance retrieved from a LUT or computed based on the distance of the pixel to the top or left neighboring block. In a final step, the 3 weights are then normalized before being applied. Alternatively, the normalization is applied after the weighted sum of the motion vectors is computed.

Figure 19:
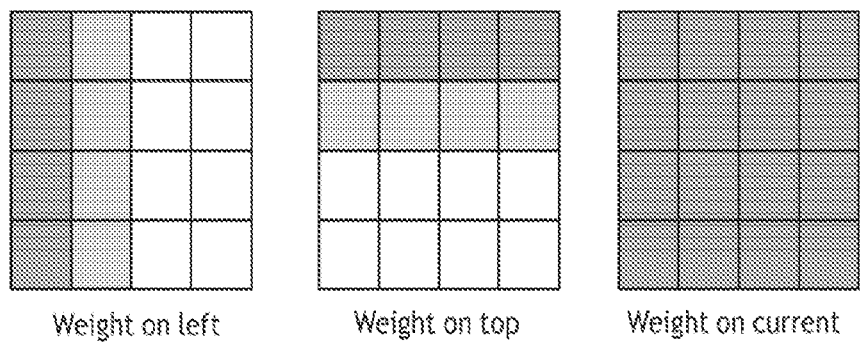
FIG. 19 illustrates a method for computing the weights of each motion vector according to a particular embodiment.

FIG. 19 illustrates a method for computing the weights of each motion vector according to a particular embodiment. For instance, in a 4×4 sub-block, FIG. 19 shows an example of default weights (respectively c'(i,j) for left neighbor motion vector, b'(i,j) for top neighbor motion vector, a'(i,j) for current neighbor motion vector) applied on each motion vector (left neighbor motion vector, top neighbor and current block motion vector) depending on the pixel position. As an example, the weights are:
  the dark grey, a weight of 0.5
  The light grey a weight of 0.25
  The white: a weight of 0

According a variant embodiment, the LUT of weights is derived from the distance of the pixel to the block of considered motion vector. Accordingly, the weights are either pre-computed and stored in a LUT of default weights as the exemplary embodiment of FIG. 19 or computed on-line as described below wherein the weighting function or the parameters W and K are adaptive. For example, for the top motion vector, the weight for pixel p(i,j) is given by:

$$w(i,D=W|1-1/K(i-i0)| \text{ if } i<i0+K$$

$$w(i,j)=0 \text{ otherwise}$$

where i0 is the coordinate of the top row, W a scale factor, and K the length of the smoothing inside the sub-block. For example, by taking W=1, K=2, it gives:

$$w(i0,j)=1$$

$$w(i0+1,j)=\tfrac{1}{2}$$

$$w(i0+2,j)=0$$

$$w(i0+3,j)=0$$

Any other decreasing weighting function from the border to the center can be used.

Figure 20:
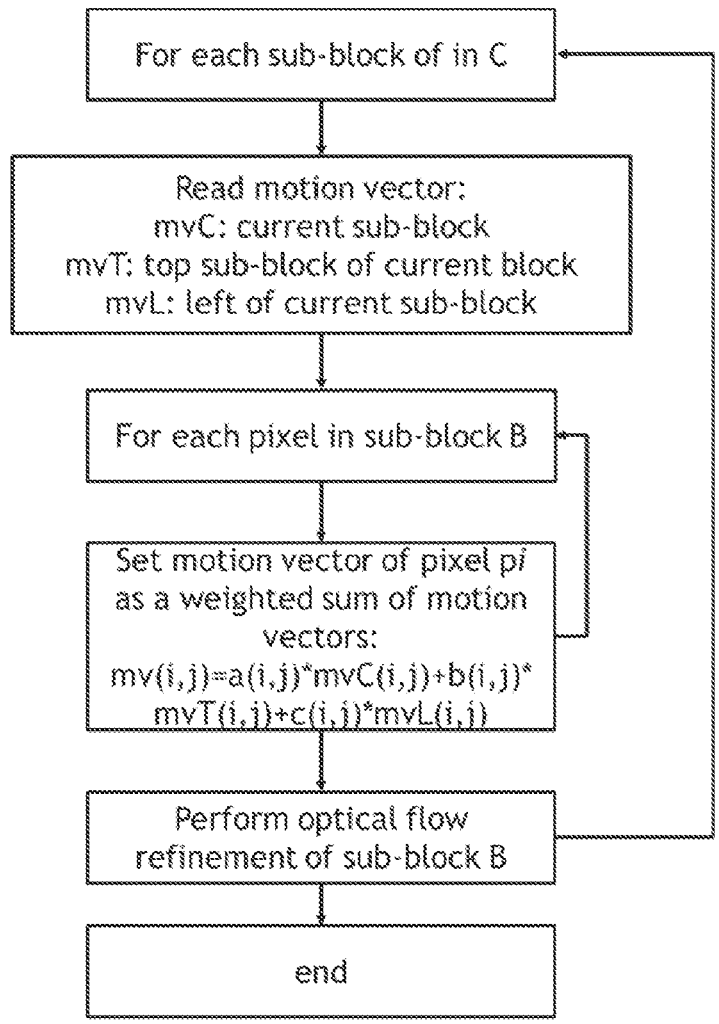
FIG. 20 illustrates a flowchart of an Optical Flow based on boundary smoothed motion compensation method according to another particular embodiment.

According to additional variants, in the case of sub-block motion vector (arising in affine or sbTMVP case for example), the present principles are applied with sub-block motion vectors as described hereafter. FIG. 20 illustrates a flowchart of an Optical Flow based on boundary smoothed motion compensation method according to this particular embodiment.

According to a first variant, when the considered block has a sub-block motion field (i.e. the motion vector for each sub-block is potentially different), the present principles are used for each sub-block of the CU. It is especially useful for sbTMVP CU where the motion field can introduce discontinuities. As illustrated on FIG. 20, for any sub-block (for instance the 16 sub-blocks of FIG. 11) of a block C, the motion vector of the current sub-block, of the top neighboring sub-block of the current sub-block and of the left neighboring sub-block of the current sub-block are retrieved from memory. Then, for each pixel the current sub-block, a new motion vector is obtained from a weighted sum of the retrieved motion vectors and an optical flow is applied to obtain a refined inter predicted pixel in the sub-block. Any of the variant embodiments described for the causal border sub-blocks B0-B6 can be easily derived for this embodiment. Advantageously this embodiment achieves inner block motion smoothing.

According to a second variant, when non-causal motion vectors are available (for example in full block processing as described above with FIG. 20), the present principles are applied by taking not only top and left neighboring motion vectors but also bottom and right. The process is the same as before except that each pixel can potentially be expressed as the weighted sum of 5 motion vectors coming from top, left, bottom, right and current sub-block. As before, the weights associated are deduced from the distance of the pixel to the considered border.

According to a third variant, the present principles are compatible with the PROF process refining the prediction using affine generated motion vector. In order to use, at the same time, the PROF process and the motion smoothing described here, the 2 processes can be combined as they use the same spatial gradients. In order to combine the processes, only the motion vector difference is changed and can be a weighted sum of the motion vector difference from PROF and the one described here. The weight between the 2 process is assumed fixed (typically 0.5).

According to another embodiment, the present principles are implemented in the reconstruction pipeline of FIG. 3. The described new tool is for instance implemented either:
  Just after the motion compensation of a prediction (namely between MC and LIC),
  After the prediction has been modified by some correction tools such as LIC (namely after the LIC, BDOF, BCW or OBMC).

According to variant embodiments, the present principles are applied automatically for all CUs, or for CUs respecting some constraints such as:
  The CU size (either in surface or length) is greater than a threshold;
  A flag is coded for the CU to indicate if the process is activated or not. The flag can be set at other level (CTU, slice);
  A flag is inferred for some modes (such as the merge mode) by using the flag value of the motion predictor.

Thus, according to a variant embodiment, the inter-prediction refinement of the image block is enabled at block level or sub-block level responsive to a size of the block being larger than a value or to an inter prediction mode of the block. Advantageously, the enabling is not signaled but implicitly derived at the decoder from other parameters. The previous embodiments are described for block or sub-block of size 4×4, however the present embodiments are not limited to 4×4 sub-blocks and any sub-block size are compatible with the present principles.

According to a variant embodiment, the inter-prediction refinement of the image block is enabled at block level, sub-block level by inserting in the signaling syntax elements a flag that enable to identify the block or sub-block to which the inter-prediction refinement is applied.

According to a variant embodiment, the inter-prediction refinement of the image block is enabled at CTU, slice or sequence level by inserting in the signaling syntax elements a flag that enable to identify the part of the image to which the inter-prediction refinement is applied. The flag is for instance signaled in a SPS header. More generally, the at least one high level syntax element enabling the inter-prediction refinement of at least one region of an image is signaled in the Sequence Parameter Set (SPS).

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 21:
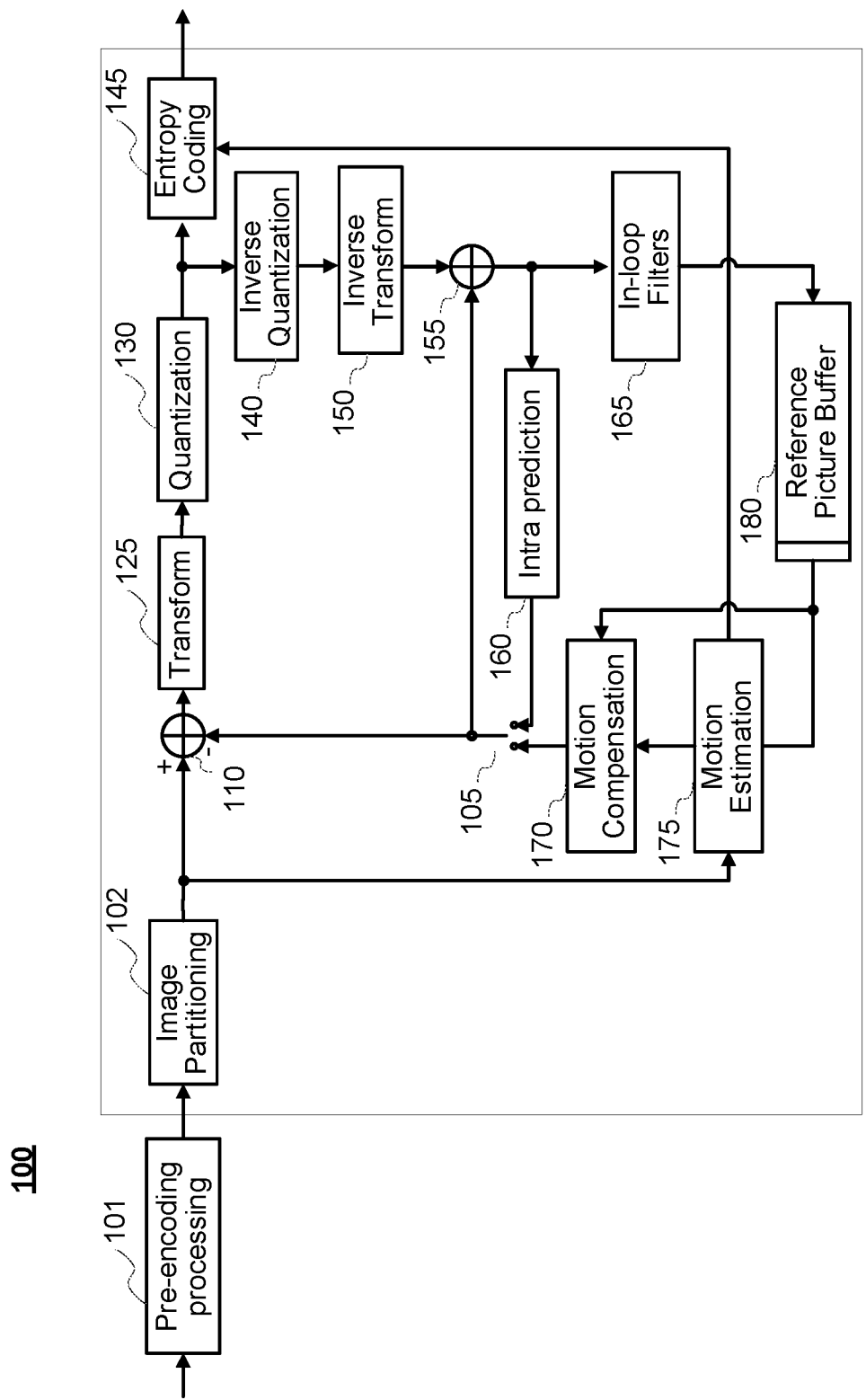
FIG. 21 illustrates a block diagram of an embodiment of video encoder in which various aspects of the embodiments may be implemented.
Figure 22:
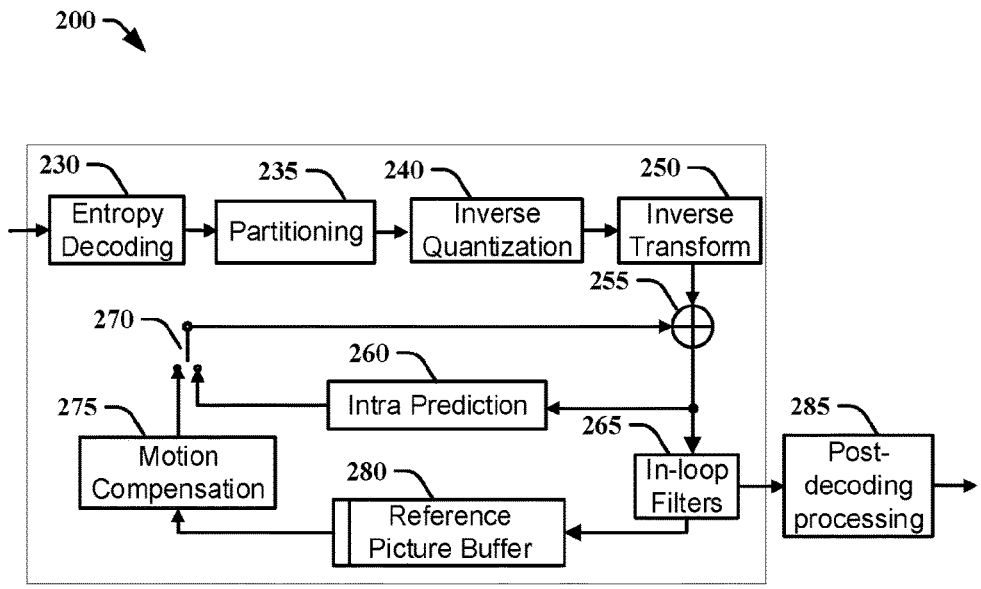
FIG. 22 illustrates a block diagram of an embodiment of video decoder in which various aspects of the embodiments may be implemented.
Figure 23:
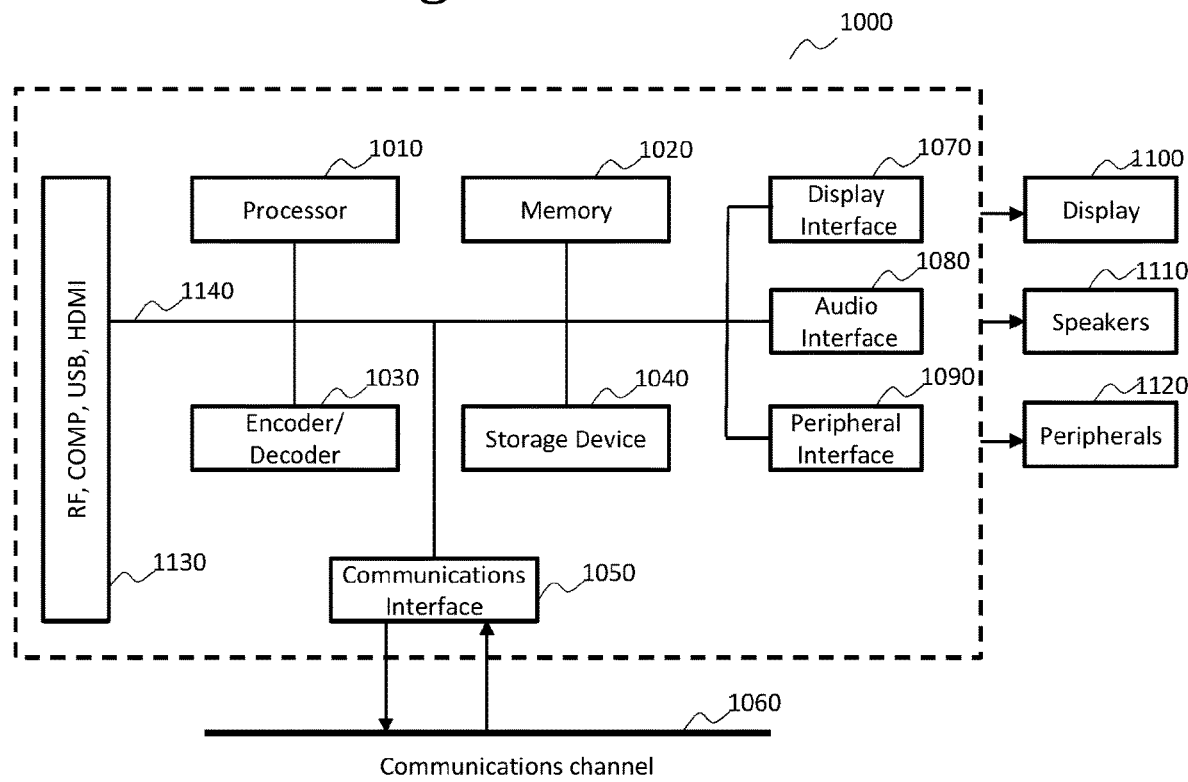
FIG. 23 illustrates a block diagram of an example apparatus in which various aspects of the embodiments may be implemented.

The aspects described and contemplated in this application can be implemented in many different forms. FIGS. 21, 22 and 23 below provide some embodiments, but other embodiments are contemplated and the discussion of FIGS. 21, 22 and 23 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion estimation and/or motion compensation modules (170, 175, 275), of a video encoder 100 and decoder 200 as shown in FIG. 21 and FIG. 22. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the weights of motion vectors or block sizes. The specific values are for example purposes and the aspects described are not limited to these specific values.

FIG. 21 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 22 illustrates a block diagram of a video decoder 200. In the decoder 200, a bitstream is decoded by the decoder elements as described below. Video decoder 200 generally performs a decoding pass reciprocal to the encoding pass as described in FIG. 21. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 23 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team). The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 23, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display.

The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, deriving an optical flow prediction refinement using motion information of boundary blocks.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, deriving an optical flow prediction refinement using motion information of boundary blocks.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, flag used to signal enabling or disabling optical flow based overlapped block motion refinement at CU and/or CTU and/or slice level, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for deriving weighting factors or deriving and/or inferring the flag enabling optical flow based overlapped block motion refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Modifying the inter prediction process applied in the decoder and/or encoder.

deriving an optical flow prediction refinement using motion information of boundary blocks in the decoder and/or encoder.

determining a refined motion vector used in optical flow based overlapped block motion refinement from a motion vector of the current block, a motion vector of the top neighboring block, a motion vector of the left neighboring block, and from motion vector weighting factors, in the decoder and/or encoder.

deriving motion vector weighting factors used in optical flow based overlapped block motion refinement, in the decoder and/or encoder.

Enabling optical flow based overlapped block motion refinement in the decoder and/or encoder.

Inserting in the signaling syntax elements that enable the decoder to identify the optical flow based overlapped block motion refinement to use in inter prediction.

Enabling optical flow based overlapped block motion refinement at CU, sub-block (4×4) or bigger block (eg 16×16) level in the decoder and/or encoder.

Inserting in the signaling syntax elements that enable the decoder to identify the CU, sub-block or block to which the optical flow based overlapped block motion refinement is applied.

Selecting, based on these syntax elements, the optical flow based overlapped block motion refinement to apply at the decoder.

A bitstream or signal that includes one or more of the described syntax elements, or variations thereof.

A bitstream or signal that includes syntax conveying information generated according to any of the embodiments described.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs optical flow based overlapped block motion refinement according to any of the embodiments described.

A TV, set-top box, cell phone, tablet, or other electronic device that performs optical flow based overlapped block motion refinement according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs optical flow based overlapped block motion refinement according to any of the embodiments described.

A TV, set-top box, cell phone, tablet, or other electronic device that receives (e.g. using an antenna) a signal over the air that includes an encoded image, and optical flow based overlapped block motion refinement according to any of the embodiments described.

The invention claimed is:

1. A method comprising for decoding a block of an image with inter-prediction refinement by:
    accessing motion information for the block, motion information for the top neighboring block, and motion information for the left neighboring block;
    obtaining new motion information for the block from a weighted sum of the motion information for the block, the motion information for the top neighboring block, and the motion information for the left neighboring block using motion information weighting factors; and
    refining inter-prediction of the image block by applying an optical flow using the new motion information for the block.

2. The method of claim 1, wherein at least one of motion information for the bottom neighboring block and motion information for the right neighboring block are further used to obtain the new motion information.

3. The method of claim 1, wherein the inter-prediction refinement of the image block is enabled at a block level or a sub-block level responsive to a size of the block being larger than a value or to an inter prediction mode of the block.

4. The method of claim 1, wherein the inter-prediction refinement of the image block is enabled at a block level or a sub-block level by decoded syntax elements including a flag that enables identifying the block or the sub-block to which the inter-prediction refinement is applied.

5. The method of claim 1, wherein the motion information weighting factors are derived based on at least one of: availability of motion information, a set of stored weighting factors, and a distance between a pixel of the block on which the inter-prediction refinement is performed and the top and left neighboring blocks.

6. The method of claim 1, wherein the inter-prediction refinement is performed for a boundary sub-block of the causal border of the image block.

7. The method of claim 1, wherein the image block has a sub-block motion field and the inter-prediction refinement is performed for any sub-block of the image block.

8. A method for encoding a block of an image with inter-prediction refinement, comprising:

accessing motion information for the block, motion information for the top neighboring block, and motion information for the left neighboring block;

obtaining new motion information for the block from a weighted sum of the motion information for the block, the motion information for the top neighboring block, and the motion information for the left neighboring block using motion information weighting factors; and refining inter-prediction of the image block by applying an optical flow using the new motion information for the block.

9. The method of claim 8, wherein at least one of motion information for the bottom neighboring block and motion information for the right neighboring block are further used to obtain the new motion information.

10. The method of claim 8, wherein the inter-prediction refinement of the image block is enabled at a block level or a sub-block level responsive to a size of the block being larger than a value or to an inter prediction mode of the block.

11. The method of claim 8, wherein the inter-prediction refinement of the image block is enabled at a block level or a sub-block level by signaling syntax elements including a flag that enables identifying the block or the sub-block to which the inter-prediction refinement is applied.

12. The method of claim 8, wherein the motion information weighting factors are derived based on at least one of: availability of motion information, a set of stored weighting factors, and a distance between a pixel of the block on which the inter-prediction refinement is performed and the top and left neighboring blocks.

13. An apparatus comprising one or more processors, wherein the one or more processors are configured to decode a block of an image with inter-prediction refinement by:

accessing motion information for the block, motion information for the top neighboring block, and motion information for the left neighboring block;

obtaining new motion information for the block from a weighted sum of the motion information for the block, the motion information for the top neighboring block, and the motion information for the left neighboring block using motion information weighting factors; and refining inter-prediction of the image block by applying an optical flow using the new motion information for the block.

14. The apparatus of claim 13, wherein at least one of motion information for the bottom neighboring block and motion information for the right neighboring block are further used to obtain the new motion information.

15. The apparatus of claim 13, wherein the inter-prediction refinement of the image block is enabled at a block level or a sub-block level responsive to a size of the block being larger than a value or to an inter prediction mode of the block.

16. The apparatus of claim 13, wherein the inter-prediction refinement of the image block is enabled at a block level or a sub-block level by decoded syntax elements including a flag that enables identifying the block or the sub-block to which the inter-prediction refinement is applied.

17. The apparatus of claim 13, wherein motion information weighting factors are derived from at least one of availability of motion information, a set of stored weighting factors and a distance between a current pixel of block on which the inter-prediction refinement is performed and the top and left neighboring blocks.

18. An apparatus comprising one or more processors, wherein said one or more processors are configured to encode a block of an image with inter-prediction refinement by:

accessing motion information for the block, motion information for the top neighboring block, and motion information for the left neighboring block;

obtaining new motion information for the block from a weighted sum of the motion information for the block, the motion information for the top neighboring block, and the motion information for the left neighboring block using motion information weighting factors; and refining inter-prediction of the image block by applying an optical flow using the new motion information for the block.

19. The apparatus of claim 18, wherein at least one of motion information for the bottom neighboring block and motion information for the right neighboring block are further used to obtain the new motion information.

20. The apparatus of claim 18, wherein the inter-prediction refinement of the image block is enabled at a block level or a sub-block level responsive to a size of the block being larger than a value or to an inter prediction mode of the block.

21. The apparatus of claim 18, wherein the inter-prediction refinement of the image block is enabled at a block level or a sub-block level by signaling syntax elements including a flag that enables to identifying the block or the sub-block to which the inter-prediction refinement is applied.

22. The apparatus of claim 18, wherein the motion information weighting factors are derived based on at least one of availability of motion information, a set of stored weighting factors and a distance between a pixel of the block on which the inter-prediction refinement is performed and the top and left neighboring blocks.

* * * * *